March 17, 1931.  C. N. FAIRCHILD  1,796,865
SERVICING STEERING POST LOCK
Filed March 2, 1927  2 Sheets-Sheet 1
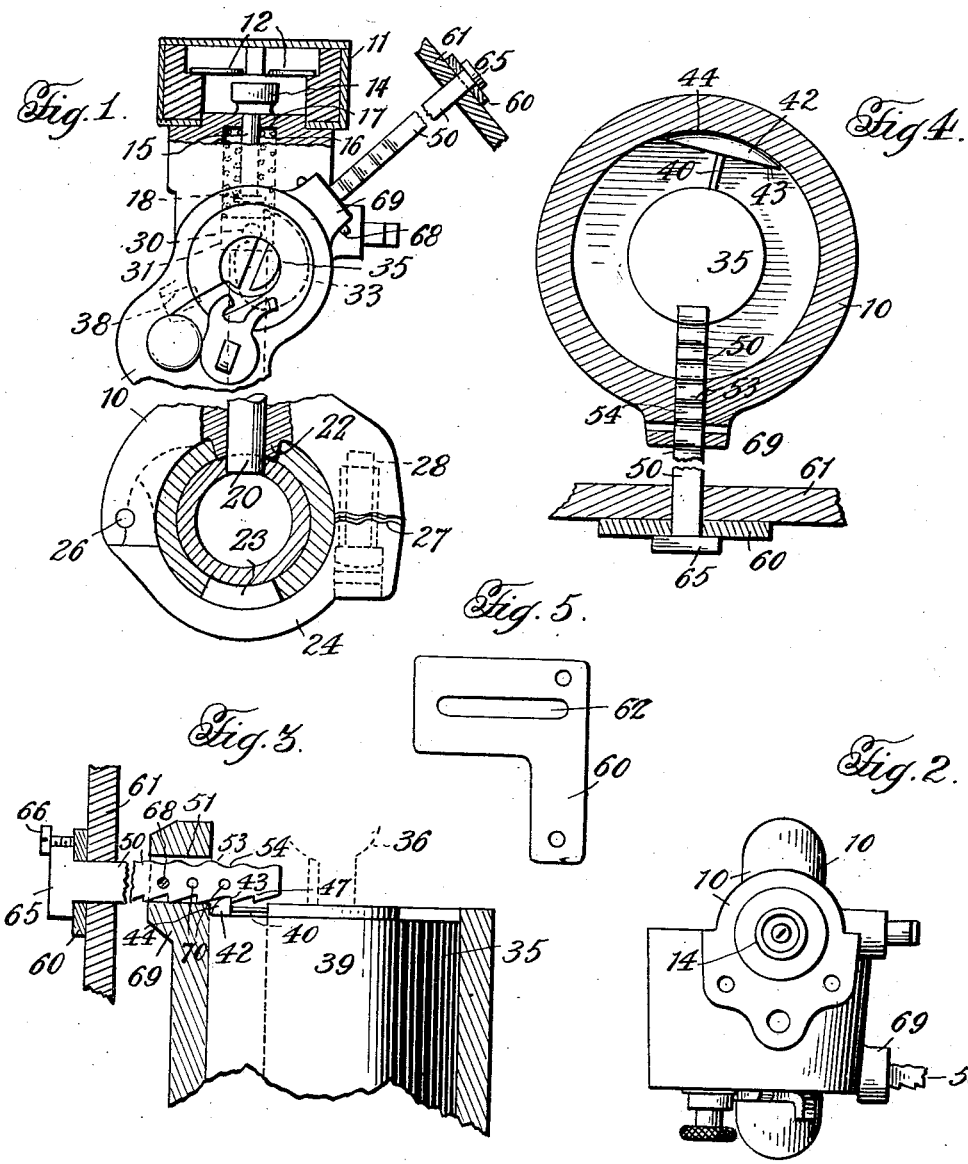
Witness:
Jas E Hutchinson
Inventor:
Charles N. Fairchild,
By Henry H. Snelling
Attorney.

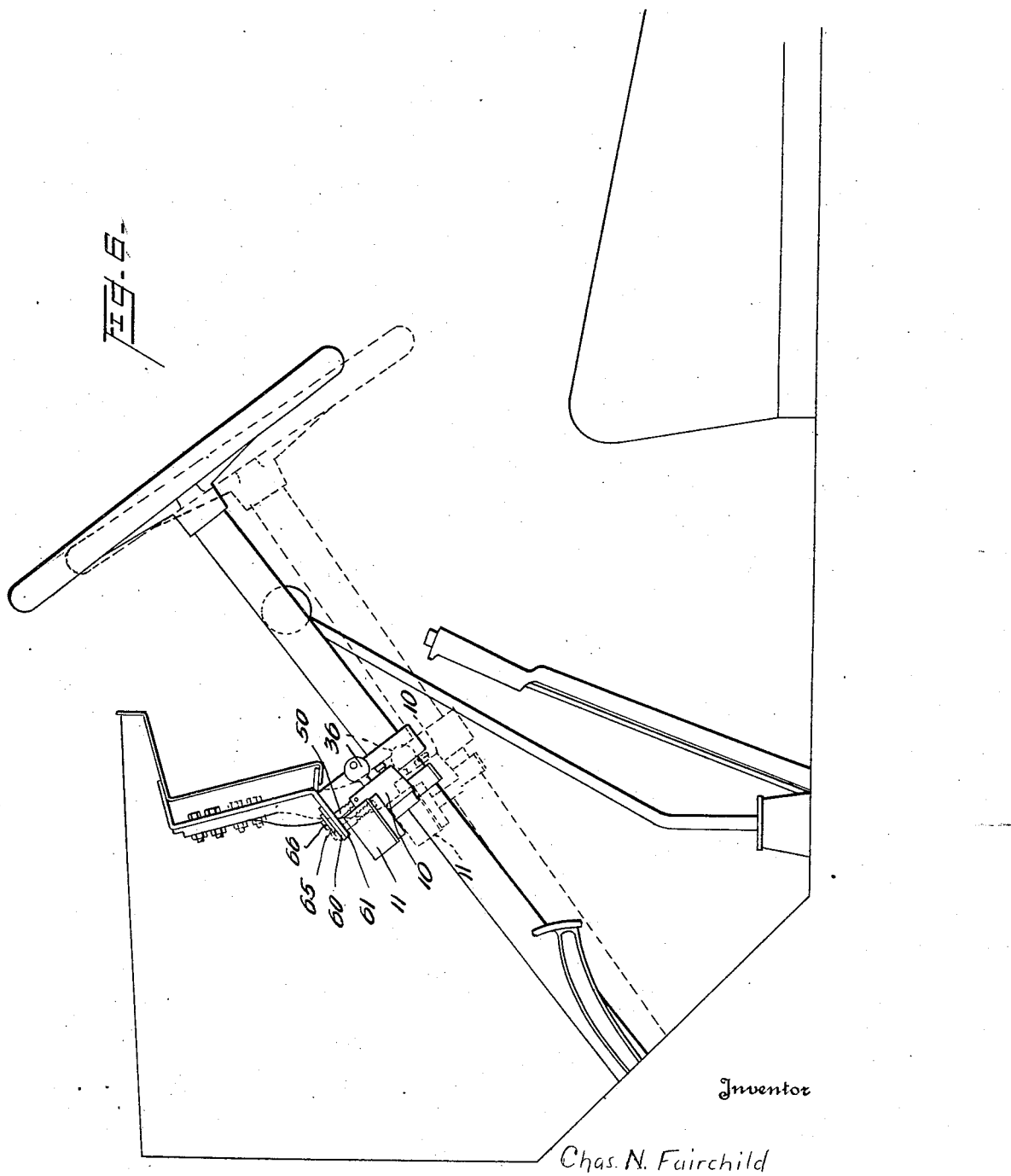

Patented Mar. 17, 1931

1,796,865

UNITED STATES PATENT OFFICE

CHARLES N. FAIRCHILD, OF NEW HAVEN, CONNECTICUT, ASSIGNOR TO FAIRCHILD LOCK CORPORATION, OF NEW YORK, N. Y., A CORPORATION OF DELAWARE

SERVICING STEERING-POST LOCK

Application filed March 2, 1927. Serial No. 172,114.

This invention relates to locks and has for its principal object the provision of a lock which can be secured to a steering post casing, for example, and serving to lock the steering post or tube against turning and yet permit of the steering post assembly being removed as a whole from the automobile for repairs when the post is unlocked.

At the present time all steering post locks are permanently secured to some fixed portion of the automobile for the obvious reason that if they were not then a thief could cut the steering post casing just beneath the lock and steer the automobile with the wheel in the usual manner since only the top portion of the cut tube would be locked to the steering shaft or tube. A serious objection naturally arises in case it is necessary to remove the steering post assembly from the vehicle, since in this case it is as difficult for the automobile mechanic to remove the lock as it would be for the thief to, and as a natural consequence the post cannot be removed.

In the present invention the steering post locking housing is permanently secured to the steering post casing as customary, but it is not permanently secured to any fixed part of the automobile, but on the contrary, a detachable link is provided which may be made removable from the dash and lock housing both, or if desired may be removable from only the housing and provision is made whereby the locking of the car locks the housing with respect to the dash or other fixed part, but permitting ready removal of the entire steering post assembly whenever desired.

A still further object of the invention is the provision of a simple and efficient key operated steering post lock which may be used on what is known as adjustable steering posts wherein the assembly is pivoted and held in adjusted position by means of a bracket so that a fat driver, for example, may move the steering post further away from the seat, giving him more room. This type of steering post is now on the market in a few cars and gives promise of continued success so it is essential that some means be provided whereby the steering post lock may accommodate this movement.

In the drawings:—

Figure 1 is a view looking down the axis of the steering post locking bolt.

Figure 2 is a view at right angles thereto.

Figure 3 is a section taken through the axes of the plunger and lock casing.

Figure 4 is a plan view of the parts shown in Figure 3.

Figure 5 is a view of a plate which may be used to secure the connecting link to the dash or other fixed part of the car.

Figure 6 is a side elevation of a portion of an automobile equipped with the improved steering post lock.

The lock housing is indicated generally at 10 and is of approximately the type shown in my Patent No. 1,592,091, July 13, 1926, including at its top a switch box 11 having a plurality of contacts 12 which are bridged by a cup-shaped contact 14 carried by but insulated from a stem 15 which is yieldingly held downwardly by a spring 16 which surrounds the stem 15 between the shoulder 17 and the head 18. The locking bolt is indicated at 20 and passes in the usual fashion through a boss 22 integral with a larger part of the housing 10. A similar boss 23 is integrally carried by the housing cap 24 which in this particular embodiment is hinged to the main portion of the housing as by a pin 26, the free end being corrugated as at 27 and permanently closed by a one-way screw 28. A pin 30 carried by the head 31 of the locking bolt 20 is engaged by a cam 33 secured to the revolving cylinder of the lock 35 which is operated by a key such as 36. The lock casing 35 is snugly received in a bore in the housing and is secured in place as by a pin 38.

In general the parts described thus far are old and well known and per se form no part of the invention, the invention being limited to the combination of a lock of this type with means for releasably locking the housing to a fixed portion of the automobile.

Referring now particularly to Figure 3 the lock cylinder 39 carries a short rod 40 to the end of which is a shoe 42 having a plane face 43 and a rounded face 44 so that it acts as a retaining member engaging the teeth 47 of the connecting link 50 which slides a little loosely in a bore 51 preferably cylindrical of the lock housing. The portion of the link 50 on the opposite side from the shoe 42 may be toothed but is preferably corrugated as indicated at 53—54.

A plate such as 60 is permanently secured to the engine side of the instrument board 61 and serves to hold the connecting link 50 which may be non-removably secured to the plate and instrument board as in my copending application filed this day or may be removably secured to the plate 60 as shown by having a head 65 which is too large to pass thru the slot 62 of the plate which, however, slidably receives the stem of the link 50. The parts as shown in Figure 3 are in locked position, that is, the steering post tube is locked against rotation and as indicated, at this time the connecting link 50 is locked against removal from the housing. The clearance between the crest 53 of the corrugation and the top of the bore as seen in the figure is considerably less than the depth of the tooth 47, consequently if the housing were pushed toward the head of the bolt the connecting link 50 would be jammed in its bore in the housing before the tooth could rise over the rounded edge 44 of the shoe. This shoe 42 makes a complete revolution with the key of the lock and is only in the path of the link in locked position. In all other positions the link is perfectly free to slide in and out the bore 50 and whenever the retaining screw 66 is removed the link may be entirely withdrawn from both dash and housing providing of course, that the steering post is not locked at that moment.

The device is obviously applicable to the ordinary steering post in which case the assembly may be serviced, that is, by unlocking the steering post the bolt 50 may be withdrawn from the housing and the entire steering post assembly may be taken to any part of the garage for repair. In adjustable steering posts the link 50 itself may take the place of the usual bracket since movement in and out of the link may be prevented by placing a pin 68 in the lug 69 integral with the housing and thru any one of the holes 70 in the link. The pin 68 is made convenient to withdraw and holds the post in one definite adjusted position irrespective of the location of the shoe 42, and whether the post is locked or not, exactly as the usual adjustable steering post bracket does.

What I claim is:—

1. The combination with an adjustable steering post and its bracket of a housing, a link secured to a fixed part of the automobile so as to be non-removable therefrom when the housing is in normal position and removably secured to said housing as the bracket is adjusted and key operated means for locking the steering post against turning and preventing separation of the link and the housing.

2. In an automobile, a member fixed with respect to the frame thereof, a housing movable with respect to said member, an adjustable steering post, key operated means within said housing for locking said steering post against turning and locking said housing against movement away from said member.

3. In a servicing steering post assembly, a steering post casing, a steering post within said casing, a housing surrounding said casing and permanently secured thereto, a member fixed with respect to the frame of the automobile, a link detachably connecting the fixed member and the housing, and key operated means within said housing for locking the post to its casing and locking said connecting link against removal from either the fixed member or the housing.

4. In a servicing steering post assembly, a steering post casing, a steering post within said casing, a housing surrounding said casing, and permanently secured thereto, a member fixed with respect to the frame of the automobile, key operated means within said housing for locking the post to its casing, a link detachably connecting the fixed member and the housing, being freely slidable in the housing when the post is unlocked, and means movable with the key operated means for barring removal of the link from the housing when the post is locked.

5. In a device of the character described, a housing to be permanently secured to the steering post casing of an automobile, a link to be secured to a fixed portion of the automobile such as the instrument board, and manually controlled means for securing the housing to the link and for locking the steering post to the casing when moved in one direction and for releasing the steering post from the steering post casing and for releasing the housing from the link when moved in another direction.

6. The device of claim 5 in which the manually controlled means is a key operated lock within the housing.

7. The device of claim 5 in which the link slides thru an orifice in the housing and the link is locked within said orifice simultaneously with the locking of the steering post.

8. The device of claim 5 in which the manually controlled means is a key operated lock within the housing, the link slides thru an orifice in the housing, and the link is locked within said orifice simultaneously with the locking of the steering post.

9. The device of claim 5 in which readily detachable means are provided to secure the link to the housing to provide for adjustment of the device when applied to an adjustable steering post so that the link acts as a bracket when the readily detachable means are in place.

10. A housing for permanent attachment to a steering post casing, a rotary lock within the housing for locking a steering post to its casing, a link longitudinally slidable with respect to the housing but held against lateral angular movement, and means for preventing such longitudinal movement when the steering post is locked.

11. The combination with a lock and a steering post housing of means slidably received within the housing and extending from the housing for relatively permanent fixture to a distant object, and means movable with the lock to prevent in one position of the lock further movement of the housing away from the object.

12. In combination, a housing to be secured to an object, lock mechanism secured to the housing to prevent relative movement of said object and a second object, means operable only when the first and second objects are locked together for preventing otherwise permissible movement of the two objects with respect to a third object and detachable means adapted to hold the first two objects at a chosen adjusted position with respect to the third object while permitting relative movement of the first two objects when the housing carried locking means is in inoperative position.

In testimony whereof I affix my signature.

CHARLES N. FAIRCHILD.